United States Patent Office 2,972,630
Patented Feb. 21, 1961

2,972,630

TETRACYCLINE DERIVATIVE AND PROCESS FOR PREPARATION

Lloyd H. Conover, Quaker Hill, and Charles R. Stephens, Jr., Niantic, Conn., assignors to Chas. Pfizer & Co., Inc., Brooklyn, N.Y., a corporation of Delaware No Drawing. Filed Sept. 25, 1958, Ser. No. 763,204

7 Claims. (Cl. 260—559)

This invention is concerned with a new and useful antimicrobial agent and with the process of its production. Moreover, this invention relates to methods for the purification of this antimicrobial agent, and the antimicrobial agent in pure crystalline form. This invention includes within its scope the new antimicrobial agent as crude concentrates and in purified forms. This novel product is especially useful in combatting microorganisms which are plant pathogens.

The new and useful antimicrobial agent of this invention is 4-dimethylamino-1,4,4a,5,7,8,9,10,12,12a-decahydro - 3,11,12a - trihydroxy - 6 - methyl - 1,10-dioxo - 2 - naphthacenecarboxamide which may be represented by the following formula:

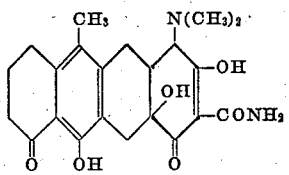

as well as the acid and base salts thereof.

The present new antibiotic has considerable activity against both Gram-positive and Gram-negative especially those microorganisms that are pathogenic to plants. It is particularly active against *Phytomonas tumefaciens* which is responsible for crown gall. Crown gall is represented by a group of diseases in which the major infection on the host is hyperplasia and hypertrophy. Crown gall affects preferably fruits, for example, apple, peach, apricot, plums, grapes and the like. Crown gall usually consists of overgrowths varying gradually in size. Such galls occur normally on the substerranean roots of fruit trees and shrubs and may also appear on the grown stems of leaves of wooday and habaceous plants. The infections of the hosts usually result in the withering of leaves and fruits.

The present new antibiotic has been found most effective in inhibiting the growth of *Phytomonas tumefaciens*. In vitro tests were carried out to detremine the minimum inhibitory concentration of this antibiotic against *P. tumefaciens*. The tests were carried out by serial dilution technique. According to this technique, a nutrient medium was prepared containing the present new antibiotic at a concentration of 100 mcg./ml. Aliquots of this medium were next diluted with varied volumes of water so that the tubes containing this new antibiotic at a concentration of 100, 50, 25, 12.5, 6.25, 3.12, 1.56, 0.78, 0.39, 0.19 mcg./ml. were obtained. These tubes were then inoculated with the test organisms, i.e. *P. tumefaciens* and incubated to determine the extent to which the microorganism grows in the presence of the antibiotic. In this fashion the minimum inhibitory concentration of the present new antibiotic was found to be 100 mcg./ml.

In addition to its inhibitory activity against *P. tumefacients*, the present new antibiotic is also possessed of considerable activity against other microorganisms which cause disease in animal and especially in humans.

The following table illustrates the activity of 4-dimethylamino - 1,4,4a,5,7,8,9,10,12,12a - decahydro - 3,11,12a-trihydroxy - 6 - methyl - 1,10 - dioxo - 2 - naphthacenecarboxamide against a group of microorganisms which causes various diseases. A number of these microorganisms are resistant to other known antimicrobial agents. The tests were carried out by serial dilution method described above. For each organism is given the minimum inhibitory concentration of the present new antibiotic expressed in mcg./ml.

TABLE 1

Antimicrobial activity in vitro of 4-dimethylamino-1,4,4a,5,7,8,9,10,12,12a - decahydro - 3,11,12a - trihydroxy-6-methyl-1,10-dioxo-2-naphthacenecarboxamide

| Microorganism: | MIC (mcg./ml.) |
|---|---|
| Hemophilus influenzae | 200 |
| Baceterium ammoniagenes | 200 |
| Clostridium perfringes | 200 |
| Bacillus subtilis | 100 |
| Erysipelothrix rhusiopathiae | 100 |
| Micrococcus pyogenes var. aureus | 100 |
| Pasteurella multocida | 100 |
| Vibrio comma | 100 |
| Mycobacterium 607 | 100 |
| Mycobacterium berolinense | 50 |

Antibiotic Resistant Strains of *Micrococcus pyogenes* var. *aureus* strains

| | |
|---|---|
| 376 | 200 |
| 400 | 200 |

This invention also includes the process for producing this new antibiotic. It has been found that under certain conditions the present new antibiotic may be prepared by the catalytic hydrogenation of anhydrotetracycline which is represented by the formula:

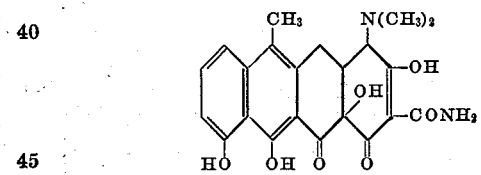

Although it is preferred to use anhydrotetracycline in the present process, tetracycline itself may also serve as a suitable substrate for the present hydrogenation process, since, under the conditions of the present process, as hereinafter described, tetracycline is converted to anhydrotetracycline in situ. The hydrogenation reaction is best carried out in the presence of mineral acid which is conveniently provided to the reaction mixture by employing the mineral acid salt of the substrate viz. anhydrotetracycline or tetracycline. Of course, it is obvious that the mineral acid, for example, hydrochloric acid, hydrobromic acid, sulfuric acid, phosphoric acid, nitric acid, and the like, and the substrate may be added separately to the reaction mixture with the concomitant formation of the substrate mineral acid salt. Usually best results are obtained when employing at least about one-half mole of mineral acid per mole of substrate although lesser amounts may be employed. It is preferred to employ non-oxidizing mineral acids since best yields are realized in so doing.

The process is carried out by contacting an organic solvent solution of anhydrotetracycline or tetracycline with hydrogen in the presence of palladium catalyst and, as mentioned above, a mineral acid. Various solvents may be employed for this purpose. Lower alkanols, for example, methanol, ethanol, isopropanol and the like are particularly suitable, while certain ethers such as dioxane, tetrahydrofuran, dimethoxyethane and the like are also useful. The solvent must be relatively inert to the reactants and the product formed. In general, the solvent should be relatively dry although a small amount of moisture does not seriously interfere with the hydrogenation process.

The reaction is generally best conducted at superatmospheric pressure of hydrogen gas. Pressures of from about 1000 to 2000 pounds/square inch are found to give excellent yields although lower pressures may be employed, e.g. 30–50 pounds/square inch. Although the reaction may be conducted at room temperature, it is generally preferred to employ somewhat elevated temperatures, for example, temperatures from about 30° C. to about 60° C. The catalyst used may be palladium suspended in a carrier, for example, carbon, although the finely divided metal itself and as well as other forms of this catalyst are found very suitable. Generally a concentration of at least 5% by weight of the substrate used is necessary. In general there is no reason to use more than equal weights of catalysts and substrate. Other hydrogenation catalysts such as platinum may be used in conducting the present process, however, palladium is found to be most useful.

The course of reaction may be conveniently followed by measuring the uptake of hydrogen gas. After the absorption of 3 moles of hydrogen per mole of substrate the reaction is complete. Generally, reaction times of from about 1 to 12 hours are required to produce an appreciable amount of product, although it should be realized that the time of reaction is dependent on various other operating conditions for the reaction, i.e. the time of reaction, the temperature, pressure, concentration of antibiotic used, catalyst which are related. The concentration of substrate in the reaction mixture does not appear to be critical. In general a solution having a concentration of from about 1% to about 10% of starting material is found satisfactory. More dilute or more concentrated solutions may be used but there is no particular advantage in so doing. When the reaction is complete the product may be recovered by any desired means, for example, after removal of the catalyst, by concentration of the resultant solution. Other methods for obtaining the crude product may be employed such as the addition of a non-solvent of the product to the filtered reaction mixture after concentration. Such non-solvents include diethyl ether, pentane, benzene, toluene and other organic non-polar solvents.

The product is obtained in the form of a salt corresponding to the mineral acid employed in the process. If preferred the amphoteric product may be obtained from the reaction mixture by neutralization of the mineral acid before concentration. The use of an alkali metal hydroxide is most convenient for this purpose. Of course, the amphoteric substance may be obtained from the isolated mineral acid salt by the usual method, for example, treating an aqueous solution of the antibiotic acid salt with alkali such as an alkali metal hydroxide.

The crude mineral acid salts of the present antibiotic as well as the amphoteric form may be further purified by convenional methods. The procedure involves dissolving the mineral acid salts in water and adjusting the pH to between 5 to 6 with aqueous alkali metal hydroxide. The resultant gummy slurry is then treated with ether after which the amphoteric form of the present new antibiotic crystallizes. The crystalline amphoteric antibiotic is then dissolved in hot methanol, clarified with activated carbon and after removal of the carbon, treated with aqueous mineral acid. The pure crystalline mineral acid salt of the antibiotic separates from the mixture and is filtered and dried by the usual method. Pure crystalline amphoteric antibiotic is obtained by dissolving the hydrochloride in hot water and neutralizing the resultant solution with an alkali metal hydroxide. The resulting crystals of the amphoteric antibiotic are then obtained by the usual method.

The present new antibiotic has certain definite advantages over currently available antibiotic compounds. This antibiotic is found substantially stable to air oxidation and to acid or base degradation. The stability of this new antibiotic makes it particularly suitable for topical applications where stability is a most important factor in the selection of the antimicrobial agent. For example, the present new antibiotic may be employed in disinfectant solutions as well as in topical ointments either alone or together with other effective antimicrobial agents. For these purposes a 0.2% concentration is useful.

It is of course obvious that chlortetracycline may also be employed as a substrate in the present new process since, under the conditions of this process, it is reduced to tetracycline, i.e. the chlorine atom of the chlortetracycline nucleus is replaced by hydrogen with concomitant formation of hydrogen chloride gas.

This new antibiotic may be condensed with certain aldehydes to form products which may possess strong antibacterial activity. For example, the present new antibiotic may be condensed with such aldehydes as p. nitrobenzaldehyde, salicylaldehyde, 5-nitrofurfuraldehyde, 5-nitrobenzylaldehyde and the like. The reaction conditions employed are generally well known. The starting compounds are allowed to react in the presence of a strong base such as an alkali metal hydroxide, for example, sodium, potassium or lithium hydroxide. Usually a lower alkanol is employed for this reaction. The crystalline products are obtained from the reaction mixture by known methods.

As mentioned above the novel antibiotic of this invention is useful in combatting *P. tumefaciens*. The antibacterial agent may be applied to the infected hosts in a variety of forms, for example, in suitable extending media, liquid or solid, which are well known in the art. For example, solutions or suspensions of the antibiotic in suitable solvents may be employed to introduce the agent into the host by root absorption. Alternatively, solid compositions containing the antibiotic in a solid extending agent, such as fullers earth, various types of clay, peatmoss and the like, may be advantageously applied to the roots of the host by conventional means. Solutions or suspensions of the antibiotic may be applied directly to the seat of infection, i.e. the gall, by conventional means. Treatment may be continued for as long as is required to combat the phytopathogen. The time required of course will vary with the host, the extent of infection and so forth.

The following examples are given by way of illustration and are not to be construed as limitations of this invention many variations of which are possible within the scope and spirit thereof.

EXAMPLE I

Anhydrotetracycline hydrochloride (25 g.) in 500 ml. of methanol is treated with 10 g. of 5% palladium on carbon and stirred with hydrogen at 50° C. and 1000–1500 p.s.i.-pressure in a stainless steel autoclave for five hours, during which time 3 molar equivalents of hydrogen are absorbed. The reaction mixture, after cooling and filtering free of catalyst, is evaporated to obtain a crude product as the hydrochloride. The crude hydrochloride (20 g.) is dissolved in 100 ml. of deionized water and the solution adjusted to pH 5–6 with 100% aqueous sodium hydroxide. The resultant gummy slurry is treated with an equal volume of ether and stirred. The product crystallizes as a white precipitate which is separated by filtration. Additional product is obtained by separation of the ether layer from the filtrate and extraction of the aqueous layer with 2 equal volumes of ether followed by concentration of the combined ether extracts.

The product is then dissolved in hot methanol, treated with activated carbon and then, after filtering off the carbon, with 5% aqueous hydrochloric acid. The pure crystalline hydrochloride of 4-dimethylamino-1,4,4a,5,7,8,9, 10,12,12a - decahydro - 3,11-12a-trihydroxy-6-methyl-1, 10-dioxo-2-naphthacenecarboxamide separates from the mixture and is filtered and dried by the usual method. The pure crystalline hydrochloride melts at 239–240° C. (dec.). When dissolved in 0.01 N HCl in methanol, exhibited the following ultraviolet absorption maxima:

$\lambda$ max=265 m$\mu$, log $\epsilon$ 4.55
$\lambda$ max=346 m$\mu$, log $\epsilon$ 3.72 and, when dissolved in 0.01 N sodium hydroxide in methanol, $\lambda$ max=272 m$\mu$, log $\epsilon$ 4.32
$\lambda$ max=349 m$\mu$, log $\epsilon$ 4.54

The pK' values in water of this hydrochloride are 4.1, 8.4 and about 12.2.

Elemental analysis gave the following results:

Calculated for $C_{22}H_{27}N_2O_6Cl$: C, 58.6; H, 6.0; N, 6.2; Cl. 7.9. Found: C, 58.6; H, 6.0; N, 5.8; Cl, 8.0.

The pure crystalline hydrochloride was converted to pure amphoteric compound by dissolving one gram in 5 ml. of hot water and neutralizing to about pH 7.0 with sodium hydroxide. The resulting crystals (0.8 g.) were filtered and recrystallized from methanol to yield a crystalline product, 4-dimethylamino-1,4,4a,5,7,8,9,10,12,12a-decahydro - 3,11,12a - trihydroxy-6-methyl-1,10-dioxo-2-naphthacenecarboxamide which melted at 209–211° C. Elemental analysis of the product gave the following results:

Calculated for $C_{22}H_{26}N_2O_6$: C, 64.0; H, 6.3; N, 6.8. Found: C, 63.8; H, 6.4; N, 6.5.

EXAMPLE II

*Preparation of aldehyde derivatives of 4-dimethylamino-1,4,4a,5,7,8,9,10,12,12a-decahydro-3,11,12a-trihydroxy-6-methyl-1,10-dioxo-2-naphthacenecarboxamide*

Four and one-half grams of the hydrochloride of 4-dimethylamino - 1,4,4a,5,7,8,9,10,12,12a-decahydro-3,11, 12a - trihydroxy - 6-methyl-1,10-dioxo-2-naphthacenecarboxamide (0.01 mole) and 1.06 g. (0.01 mole) of benzaldehyde in 100 ml. of ethanol containing 2.0 g. of potassium hydroxide was stirred for seven hours. The resulting slurry was acidified with hydrochloric acid, diluted with 100 ml. of water and the resultant solution adjusted to pH 6.0 to 7.0 with alkali (NaOH). The crystalline benzal derivative separated and was filtered.

Employing the procedure, the corresponding 5-nitrofurfural, p-nitrobenzaldehyde, salicylaldehyde and other aldehyde derivatives are prepared.

The p-nitrobenzaldehyde derivative had a bioassay of 22 oxytetracycline units/mg. in the *K. pneumoniae* plate assay.

The crystalline amphoteric antibiotic is converted to acid salts by dissolving in hot methanol followed by addition of the acid to the resultant solution. The crystalline acid salt separates from the mixture on standing or after concentration of the mixture. Employing this procedure the following mineral acids are used to form the corresponding acid salts: phosphoric, sulfuric, and nitric. Additionally organic acid salts are formed with the following strong organic acids: citric, tartaric, glycollic, gluconic, malic, succinic and glutaric acids. This procedure is also used to form basic salts of the antibiotic with the following alkali metal and alkaline earth metal hydroxides, sodium, potassium, lithium, calcium, barium, magnesium and strontium hydroxides.

What is claimed is:

1. A compound selected from the group consisting of 4 - dimethylamino - 1,4,4a,5,7,8,9,10,12,12a-decahydro-3,11,12a - trihydroxy-6-methyl-1,10-dioxo-2-naphthacenecarboxamide, the mineral acid salts thereof, the alkali metal salts thereof and the alkaline earth metal salts thereof.

2. 4 - dimethylamino - 1,4,4a,5,7,8,9,10,12,12a-decahydro - 3,11,12a-trihydroxy-6-methyl-1,10-dioxo-2-naphthacenecarboxamide.

3. A mineral acid salt of 4-dimethylamino-1,4,4a,5,7, 8,9,10,12,12a - trihydroxy-6-methyl-1,10-dioxo-2-naphthacenecarboxamide.

4. An alkali metal salt of 4-dimethylamino-1,4,4a,5,7, 8,9,10,12,12a - trihydroxy-6-methyl-1,10-dioxo-2-naphthacenecarboxamide.

5. An alkaline earth metal salt of 4-dimethylamino-1,4,4a,5,7,8,9,10,12,12a - trihydroxy-6-methyl-1,10-dioxo-2-naphthacenecarboxamide.

6. A process for the preparation of a mineral acid salt of 4 - dimethylamino-1,4,4a,5,7,8,9,10,12,12a-decahydro-3,11,12a - trihydroxy-6-methyl-1,10-dioxo-2-naphthacenecarboxamide which comprises contacting an inert organic solvent solution of a tetracycline compound selected from the group consisting of tetracycline and anhydrotetracycline with hydrogen in the presence of a palladium catalyst and a mineral acid at a temperature of from about 30° to about 60° C. and under a pressure up to about 2000 pounds per square inch until approximately three moles of hydrogen have reacted with each mole of said tetracycline compound.

7. A process for the preparation of a mineral acid salt of 4 - dimethylamino-1,4,4a,5,7,8,9,10,12,12a-decahydro-3,11,12a - trihydroxy-6-methyl-1,10-dioxo-2-naphthacenecarboxamide, which comprises contacting an inert polar organic solvent solution of a tetracycline compound selected from the group consisting of tetracycline and anhydrotetracycline with hydrogen in the presence of a palladium catalyst and a mineral acid at a temperature of from about 30° to about 60° C. and under a pressure up to about 200 pounds per square inch until approximately three moles of hydrogen have reacted with each mole of said tetracycline compound.

References Cited in the file of this patent

UNITED STATES PATENTS

| | | |
|---|---|---|
| 2,731,497 | McCormick | Jan. 17, 1956 |
| 2,744,932 | Waller | May 8, 1956 |

FOREIGN PATENTS

| | | |
|---|---|---|
| 167,750 | Australia | May 25, 1956 |
| 534,498 | Canada | Dec. 18, 1956 |